(12) United States Patent
Weinstein

(10) Patent No.: US 6,470,451 B1
(45) Date of Patent: Oct. 22, 2002

(54) CANCELLATION METHOD FOR AN AUTOMATIC TICKET SYSTEM

(75) Inventor: Luke Anthony Weinstein, Deep River, CT (US)

(73) Assignee: International Computers Limited, London (GB)

(*) Notice: Subject to any disclaimer, the term of this patent is extended or adjusted under 35 U.S.C. 154(b) by 0 days.

(21) Appl. No.: 09/257,226

(22) Filed: Feb. 25, 1999

(51) Int. Cl.[7] .................................................. G06F 1/24
(52) U.S. Cl. ........................ 713/185; 713/161; 713/166
(58) Field of Search ................................. 713/185, 161, 713/166, 168, 172, 182

(56) References Cited

U.S. PATENT DOCUMENTS

| | | | | |
|---|---|---|---|---|
| 5,502,759 A | * | 3/1996 | Cheng et al. | 379/114.14 |
| 5,979,773 A | * | 11/1999 | Findley et al. | 235/380 |
| 6,003,014 A | * | 12/1999 | Lee et al. | 705/13 |
| 6,018,717 A | * | 1/2000 | Lee et al. | 705/13 |
| 6,314,409 B2 | * | 11/2001 | Schneck et al. | 380/259 |

* cited by examiner

Primary Examiner—Thomas R. Peeso
(74) Attorney, Agent, or Firm—Lee, Mann, Smith, McWilliams, Sweeney & Ohlson

(57) ABSTRACT

Subscribers are given access to a series of events by a smart card acting as an electronic ticket, which operates automatic turnstile. A subscriber can cancel the card in respect of a particular event by telephoning a cancellation office and verbally communicating the identifying number of the subscriber's card. This number is entered into a stop list for the event. The stop list automatically controls the automatic turnstile to prevent access to the event by use of any card on the stop list for this event. Each subscriber has a hand-held reader device, for displaying a sequence number and authentication code from the card. At the cancellation office, the card is authenticated by generating a check code from the sequence number and comparing it with the authentication code communicated by the subscriber.

8 Claims, 1 Drawing Sheet

CANCELLATION METHOD FOR AN AUTOMATIC TICKET SYSTEM

BACKGROUND TO THE INVENTION

This invention relates to a method for performing cancellations in an automatic ticket system.

Smart cards have many potential uses in business. One such use is as an "electronic purse" for storing a number of units of credit, which can then be used for purchasing goods or services. Another use is in customer loyalty schemes, to record bonus points earned by customers and to allow them to be redeemed.

Another use that has been proposed for a smart card is as an "electronic ticket", for a series of events such as sports events. In this case, the card would be used to give a subscriber access to each event in the series, for example through an automatic turnstile. However, a problem with this is that, if the subscriber does not attend the event, perhaps due to unforeseen circumstances, there is currently no convenient way in which he or she can cancel the ticket for the event. As a result, there is no convenient way in which the empty seat would be used. Event organisers often do not like to have empty seats (even though they have been paid for), since they represent lost opportunities for associated revenue, such as from car parking, program sales, beer sales, and so on.

One solution to this problem that has been suggested is to allow ticket transfers through an Internet site. Using a smart card reader connected to the subscriber's personal computer, the subscriber can effectively unload the ticket for a particular event on to the Internet site. The ticket therefore becomes available for resale or to be picked up by a nominated person at the box office. A problem with this, however, is that it requires a considerable amount of infrastructure: an Internet site, and personal computers with card readers attached.

The object of the invention is to provide a way of overcoming the problem of ticket cancellation, without the need for this amount of infrastructure.

SUMMARY OF THE INVENTION

According to the invention, a method for providing access to a series of events comprises:

a) issuing each of a number of subscribers with a token, each token having a unique identifying number, and each token permitting entry to each of the series of events;

b) allowing a subscriber to cancel the token in respect of a particular event by telephoning a cancellation office and verbally communicating the identifying number of the subscriber's token;

c) at the cancellation office, entering the identifying number of the subscriber's token into a stop list for the particular event; and d) using the stop list to deny access to the event by use of any token on the stop list for that event.

The invention thus allows a subscriber simply to telephone the cancellation office, and request cancellation in respect of a particular event. The subscriber's seat for the event can then be offered for resale, or transferred to a third party, with the knowledge that the subscriber cannot now use the token for this event.

Preferably, access to the event is controlled by means of an automatic turnstile, operated by the token, and the stop list is used to control the automatic turnstile to deny access to an event by use of any token on the stop list for that event.

One problem that could arise with this arrangement is that some person other than the subscriber might use this mechanism improperly, for example to get a seat at some popular event.

In a preferred form of the invention, the method includes:

a) issuing each subscriber with a hand-held reader device, into which a token can be inserted;

b) in the token, generating a sequence number, and then performing a predetermined operation on the sequence number, to generate an authentication code;

c) passing the sequence number and authentication code from the token to the reader device, and displaying the sequence number and authentication code on the reader device, whereby the user can communicate the sequence number and authentication code, as displayed on the reader device, to the cancellation office, verbally by telephone; and d) at the cancellation office, applying the same predetermined operation to the sequence number, to generate a check code, and comparing the check code with the authentication code communicated by the subscriber.

It can be seen that, if the check code generated at the cancellation office matches the authentication code communicated by the subscriber, the cancellation office can be reasonably sure that the person requesting the cancellation is the actual token holder.

One embodiment of the invention will now be described by way of example with reference to the accompanying drawings.

DESCRIPTION OF AN EMBODIMENT OF THE INVENTION

Figure 1:
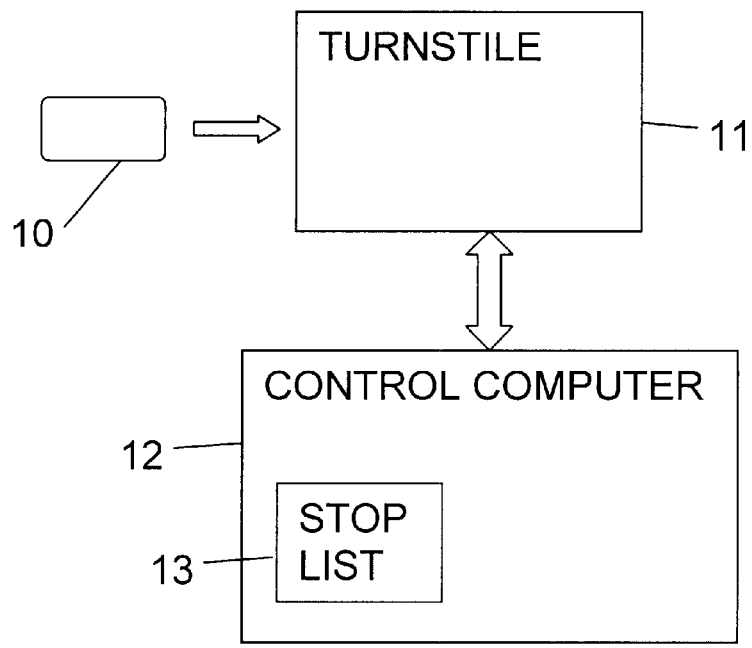
FIG. 1 is a schematic representation of a smart card controlled admission system for events.
Figure 2:
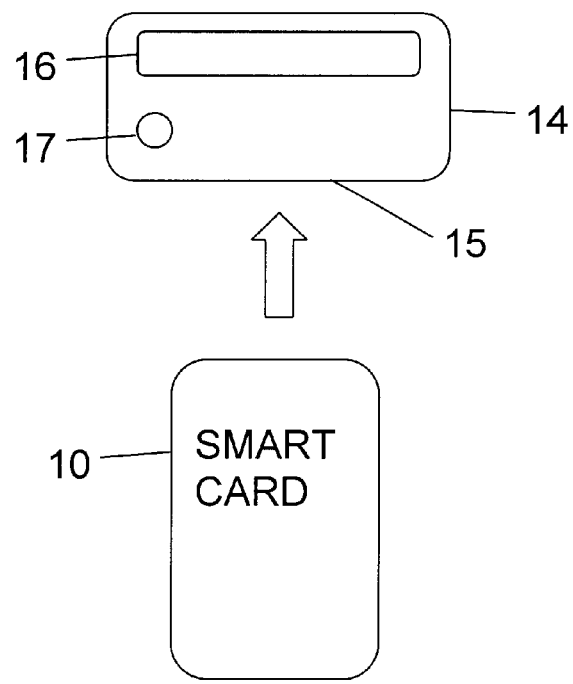
FIG. 2 shows a smart card, and a card reader device for use in an authentication process.

Referring to FIGS. 1 and 2, the embodiment of the invention to be described is concerned with a system for providing an electronic ticket for a series of events. In this system, each subscriber for the series of events is issued with a smart card 10, which can be used at automatic turnstiles 11 to gain access to any event in the series. The card may also optionally act as an electronic purse, holding a cash balance that may be used, for example, to pay for goods at the event.

The turnstiles 11 are linked to a controlling computer 12, which checks the validity of each card presented at the turnstiles. The computer 12 holds, in its memory, a stop list 13, which consists of a list of card numbers that should not be used at the current event, for example because the card has been cancelled in respect of this particular event.

Each smart card 10 has an internal register (not shown), which holds a transaction sequence number. This number is automatically incremented after each transaction involving the card, such as using it to enter an event, or to make a payment.

Each subscriber is also issued with a card reader 14. The card reader is a small, low-cost hand-held device of the type sometimes referred to as a key-chain balance reader. The card reader has a slot 15 into which a smart card can be inserted, and a small liquid crystal display (LCD) screen 16 on which it can display information. The card reader may serve a conventional purpose of displaying information stored on the card (such as a credit balance if the card also serves as an electronic purse).

The card reader 14 has a special button 17 on it, referred to herein for convenience as the "red" button, although it will be appreciated that it does not necessarily need to be red. The purpose of this button will become apparent below.

A subscriber can cancel the card in respect of a particular event by means of the following procedure.

First, the subscriber telephones a specified cancellation office. This may for example be the same as the box office for the event, or may be another office, dedicated to processing cancellations. The cancellation office clerk will ask for the subscriber's name and card number, and details of the event for which the card is to be cancelled. These details are entered into the computer 12.

The clerk will then ask the user to insert the smart card into the card reader, and to press the red button. This will cause the card reader to send a sequence number request message to the card. In response to this, the card reads the current transaction sequence number from its internal register, and returns it to the card reader, where it is displayed on the LCD screen 16. The subscriber then reads the number from the screen to the clerk, who enters this number in the computer 12. The computer checks that this sequence number is greater than the previous sequence number from the same card: if it is not greater, the transaction is not allowed to proceed.

The card then encrypts the sequence number, using a predetermined encryption algorithm and an encryption key known only to the card and to the computer 12. This generates an authentication code. The authentication code is returned to the card reader and displayed on the LCD screen 16 on release of the red button. The subscriber then reads the authentication code from the screen to the cancellation office clerk, who enters this number in the computer 12.

The computer then encrypts the sequence number, using the same encryption algorithm and encryption key as used on the card, and compares the result with the authentication code supplied by the subscriber. If they are equal, the card number is added to the stop list 13. The seat can then either be transferred to a third party (perhaps a friend or client of the subscriber), or offered for resale. If the seat is resold, the subscriber may be refunded a percentage of the value of the ticket.

Some Possible Modifications

It will be appreciated that many modifications may be made to the system described above without departing from the scope of the present invention. For example, instead of displaying the authentication code on release of the button, the card reader could be arranged to display the authentication code after a predetermined time delay, or when the button is pressed again. The card reader could have other buttons, for example for controlling the display of other information such as a credit balance. Alternatively, the card reader could have no buttons at all, being activated simply by the act of inserting and removing the card.

Although in the preferred embodiment described above, an automatic turnstile is used, in other embodiments of the invention different ways may be used to control entry to the event. For example, at entry to the event, the card could be presented to a card reader device (such as a point-of-sale terminal) and this device could then alert a human operator if the card was on the stop list.

What is claimed is:

1. A method for providing access to a series of events comprising:
    a) issuing each of a number of subscribers with a token, each token having a unique identifying number, and each token permitting entry to each of the series of events;
    b) allowing a subscriber to cancel the token in respect of a particular event by telephoning a cancellation office and verbally communicating the identifying number of the subscriber's token;
    c) at the cancellation office, entering the identifying number of the subscriber's token into a stop list for the particular event; and
    d) using the stop list to deny access to the event by use of any token on the stop list for that event.

2. A method according to claim 1 wherein each token comprises a smart card.

3. A method according to claim 1 wherein access to the event is controlled by means of an automatic turnstile, operated by the token, and the stop list is used by the automatic turnstile to automatically deny access to an event by use of any token on the stop list for that event.

4. Apparatus for use in authenticating a smart card, comprising:
    a hand-held smart card reader, into which a smart card can be inserted;
    means on the smart card for generating a sequence number, and passing that number to the reader;
    means on the reader for displaying the sequence number;
    means on the smart card for performing a predetermined operation on the transaction number, to generate an authentication code, and for passing the authentication code to the reader; and
    means on the reader for displaying the authentication code.

5. A method for providing access to a series of events, the method comprising:
    a) issuing each of a number of subscribers with a token, each token having a unique identifying number, and each token permitting entry to each of the series of events;
    b) issuing each subscriber also with a hand-held reader device, into which the token can be inserted;
    c) in the token, generating a sequence number, and then performing a predetermined operation on the sequence number, to generate an authentication code;
    d) passing the sequence number and authentication code from the token to the reader device, and displaying the sequence number and authentication code on the reader device,
    e) allowing a subscriber to cancel the token in respect of a particular event by telephoning a cancellation office and verbally communicating to the cancellation office the sequence number and authentication code as displayed on the reader device, and the identifying number of the subscriber's token;
    f) at the cancellation office, applying the same predetermined operation to the sequence number, to generate a check code, and comparing the check code with the authentication code communicated by the subscriber;
    g) at the cancellation office, if the check code is equal to the authentication code communicated by the subscriber, entering the identifying number of the subscriber's token into a stop list for the particular event; and h) using the stop list to deny access to the event by use of any token on the stop list for that event.

6. A method according to claim 5 wherein access to the event is controlled by means of an automatic turnstile, operated by the token, and the stop list is used by the automatic turnstile to automatically deny access to an event by use of any token on the stop list for that event.

7. A method according to claim 5 wherein each token comprises a smart card.

8. A method according to claim 5 wherein the step of performing a predetermined operation on the sequence number token comprises encrypting the sequence number.

* * * * *